US009691200B2

(12) United States Patent
Venkatesan et al.

(10) Patent No.: US 9,691,200 B2
(45) Date of Patent: Jun. 27, 2017

(54) ENERGY SAVING SECURITY SYSTEM

(75) Inventors: Balamurugan Venkatesan, Madurai (IN); Ranjit Mathew Kumaracheril, Madurai (IN); Nathan Gerner, Waukesha, WI (US); John M. Reske, Racine, WI (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 621 days.

(21) Appl. No.: 12/611,580

(22) Filed: Nov. 3, 2009

(65) Prior Publication Data

US 2011/0102134 A1 May 5, 2011

(51) Int. Cl.

| | |
|---|---|
| ***G08B 13/08*** | (2006.01) |
| ***G08B 25/00*** | (2006.01) |
| ***G01V 3/00*** | (2006.01) |
| ***B60Q 1/00*** | (2006.01) |
| ***G08B 21/00*** | (2006.01) |
| ***G08B 23/00*** | (2006.01) |
| ***G08B 5/22*** | (2006.01) |
| ***G08B 19/00*** | (2006.01) |
| ***B60R 25/00*** | (2013.01) |
| ***G05B 19/00*** | (2006.01) |
| ***G08B 29/00*** | (2006.01) |
| ***G05B 23/00*** | (2006.01) |
| ***G07C 9/00*** | (2006.01) |

(52) U.S. Cl.

CPC ........... *G07C 9/00103* (2013.01); *G07C 9/00* (2013.01)

(58) Field of Classification Search

CPC .................................................. G07C 9/00111

See application file for complete search history.

(56) References Cited

U.S. PATENT DOCUMENTS

| | | | | |
|---|---|---|---|---|
| 4,058,740 | A * | 11/1977 | Dalton et al. | 307/116 |
| 4,189,692 | A * | 2/1980 | Bonnar | 335/205 |
| 5,070,442 | A * | 12/1991 | Syron-Townson | G07C 9/00103 340/12.32 |
| 5,325,084 | A | 6/1994 | Timm et al. | |

(Continued)

FOREIGN PATENT DOCUMENTS

| | | | |
|---|---|---|---|
| CN | 1983964 | A | 6/2007 |
| CN | 101027700 | A | 8/2007 |

(Continued)

OTHER PUBLICATIONS

Trundle et al., Remote thermostat control/energy monitoring, pp. 1-12.*

(Continued)

*Primary Examiner* — Steven Lim
*Assistant Examiner* — Muhammad Adnan
(74) *Attorney, Agent, or Firm* — Husch Blackwell LLP

(57) ABSTRACT

A method and an apparatus are provided for protecting a secured space. The method includes the steps of providing a secured space including a first secured area and a second secured area accessed through the first secured area, wherein the second secured area has a relatively higher security level than the first secured area, controlling access into each of the first and second secured areas via at least one access controller, and deactivating a portion of the at least one access controller in accordance with a predetermined event and a security level.

15 Claims, 6 Drawing Sheets

(56) References Cited

U.S. PATENT DOCUMENTS

| | | | | |
|---|---|---|---|---|
| 5,490,460 | A * | 2/1996 | Soble | B41F 35/001 101/423 |
| 7,406,968 | B1 | 8/2008 | Holbrook | |
| 7,639,846 | B2 * | 12/2009 | Yoda | G07C 9/00166 340/5.83 |
| 8,242,905 | B2 | 8/2012 | Gerner et al. | |
| 8,638,231 | B2 * | 1/2014 | Zheng | G07C 9/00071 340/5.52 |
| 9,014,435 | B2 * | 4/2015 | Ohnishi | G06K 9/00771 382/115 |
| 2003/0098777 | A1 * | 5/2003 | Taylor | G07C 9/00103 340/5.61 |
| 2005/0093679 | A1 * | 5/2005 | Zai | G06K 7/10356 340/10.2 |
| 2006/0255129 | A1 * | 11/2006 | Griffiths | G07C 1/10 235/382 |
| 2007/0030120 | A1 * | 2/2007 | Gusse | G07C 9/00031 340/5.61 |
| 2007/0078782 | A1 * | 4/2007 | Ono | G06Q 10/10 705/67 |
| 2007/0083915 | A1 | 4/2007 | Janakiraman et al. | |
| 2007/0096868 | A1 | 5/2007 | Bauchot et al. | |
| 2008/0231118 | A1 * | 9/2008 | Roepke | 307/64 |
| 2008/0291036 | A1 * | 11/2008 | Richmond | 340/628 |
| 2009/0189735 | A1 * | 7/2009 | Murakami | 340/5.64 |
| 2010/0188009 | A1 * | 7/2010 | Bull | H05B 37/0245 315/246 |
| 2010/0245087 | A1 | 9/2010 | Gerner et al. | |
| 2010/0289643 | A1 * | 11/2010 | Trundle et al. | 340/545.1 |

FOREIGN PATENT DOCUMENTS

| | | | |
|---|---|---|---|
| CN | 101295412 | A | 10/2008 |
| CN | 101413992 | A | 4/2009 |
| GB | 2 095 016 | A | 9/1982 |
| WO | WO 2005/124655 | A2 | 12/2005 |

OTHER PUBLICATIONS

Great Britain's Intellectual Property Office's Search Report corresponding to Application No. GB1017829.1 dated Feb. 11, 2011.

Great Britain's Intellectual Property Office's Combined Search and Examination Report corresponding to Application No. GB1017829.1, dated Feb. 14, 2011.

First Office Action and Search Report for corresponding CN patent application 201010532390.9, dated Apr. 15, 2014.

English-language translation of abstract for CN 1983964A, dated Jun. 20, 2007.

English-language translation of abstract for CN 101027700A, dated Aug. 29, 2007.

English-language translation of abstract for CN 101295412A, dated Oct. 29, 2008.

English-language translation of abstract for CN 101413992A, dated Apr. 22, 2009.

English-language translation of First Office Action and Search Report for corresponding CN patent application 201010532390.9, dated Apr. 15, 2014.

* cited by examiner

ENERGY SAVING SECURITY SYSTEM

FIELD OF THE INVENTION

The field of the invention relates to security systems and, more particularly, to multi-zone security systems.

BACKGROUND OF THE INVENTION

Multi-zone security systems are generally known. Such systems are typically used wherever an organization has assets (e.g., people, organizational property, etc.) to protect. An example of such a situation could be a retail organization. In this case, a retail organization may operate within a first secured area or zone in which only employees of the organization are allowed. One or more high security areas or zones may also exist within the first secured area for high value assets (e.g., cash, confidential information, etc.).

Isolating the security zones may be done with a physical barrier (e.g., walls, fences, etc.) with one or more access points (e.g., doors). Physical passage through the access points may be provided through the use of a respective access controller. The access controller may include a lock controlling the opening of the door coupled to a user identification device (e.g., a keypad for entry of a access code, a fingerprint or iris scanner for physical identification of a user, a card reader, etc.).

The access controller may have an entry portion outside of the secured area to control entry into the secured area. The access controller may also have an egress portion to control egress from the secured area.

While each of the access controllers of the zones could operate independently, they are, instead, typically coupled to a security panel. The security panel is typically located in a high security area and functions to compare indicia of identity with a reference indicia of identity saved within a computer file.

While security systems operate relatively well, the access controllers are typically maintained in an activated state continuously to detect the need for access. However, there are times when no access is requested or needed. Accordingly, a need exists for better methods of controlling power consumption in access controllers.

DETAILED DESCRIPTION OF AN ILLUSTRATED EMBODIMENT

Figure 1:
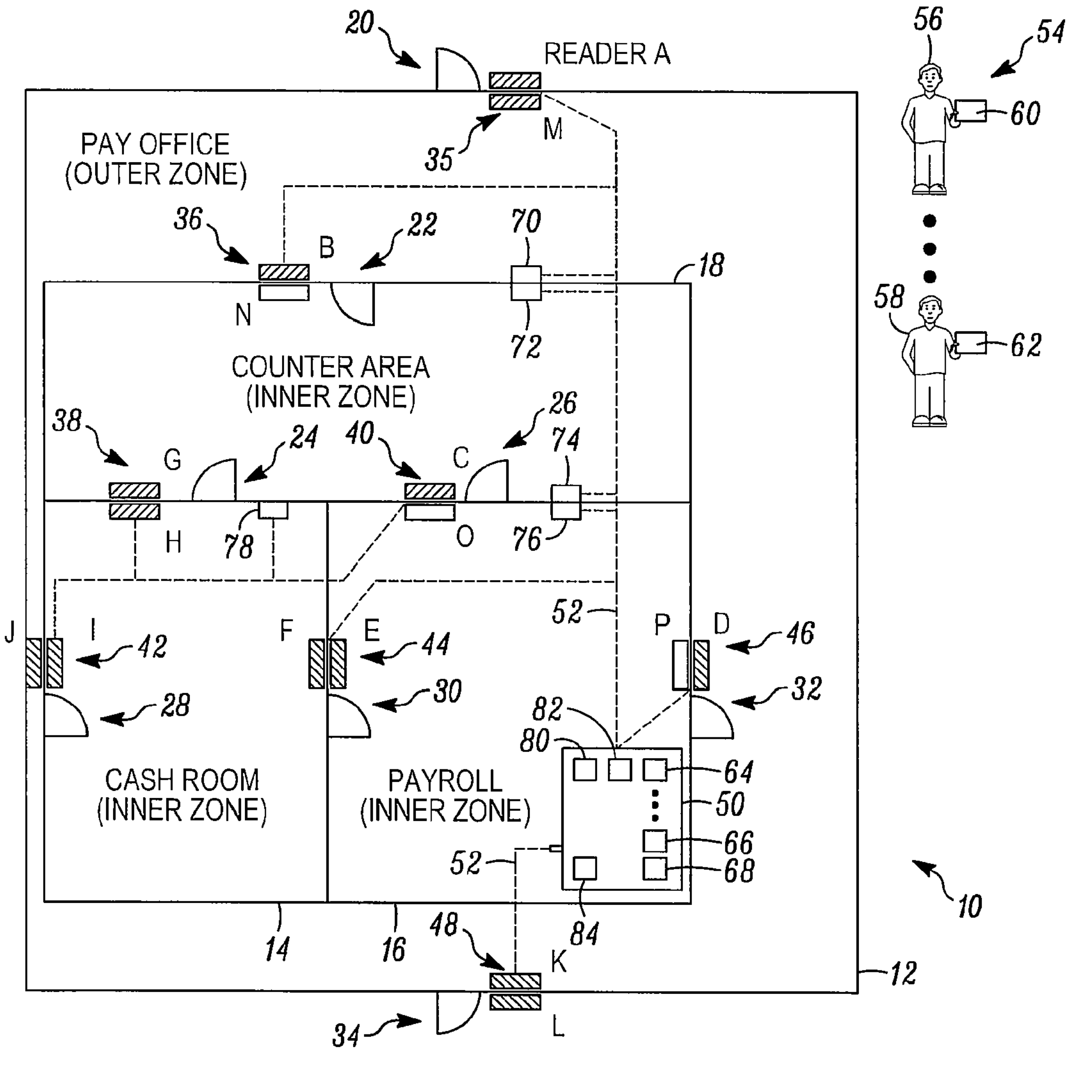
FIG. 1 depicts a security system in accordance with an illustrated embodiment of the invention.

FIG. 1 depicts an energy efficient security system 10 shown generally in accordance with an illustrated embodiment of the invention. The security system 10 operates to protect one or more secured areas or zones (e.g., security area or zone 12). Included within the secured area 12 may be one or more inner security areas or zones 14, 16, 18. The inner security areas or zones 14, 16, 18 may be of a relatively higher level of security than the outer security area 12.

Associated with the security areas 12, 14, 16, 18 is a number of access points 20, 22, 24, 26, 28, 30, 32, 34. Each access point 20, 22, 24, 26, 28, 30 includes at least three elements. The elements include the physical barrier (e.g., a door), an actuator that controls the physical barrier (e.g., a solenoid activated lock), and an access controller 35, 36, 38, 40, 42, 44, 46, 48 that electrically activates the actuator.

Each access controller 35, 36, 38, 40, 42, 44, 46, 48 may also include one or more user identification devices A-P. The user identification devices may operate to identify persons under any of a number of different formats (e.g., card readers, fingerprint readers, iris scanners, etc.). For example, the access controller 35 for the access point 20 may include a first card reader (hereinafter "card reader in", labeled "A" in FIG. 1) that allows a person to get into a security area 12 and a second card reader (hereinafter "card reader out", labeled "M" in FIG. 1) that allows a person to get out of the security area 12. The card readers in A, B, C, D, E, F, G, H, J, L may each be used to gain access into a respective security area 12, 14, 16, 18. Similarly, the card readers out C, E, F, G, H, I, K, M, N, O, P may each be used to exit a respective security area 12, 14, 16, 18. It should be noted in this regard that some card readers (e.g., H) may be a card reader in when a person passes from the inner security area 14 to the inner security area 18 and a card reader out when the person passes from the inner security area 18 to the inner security area 14.

The card readers A-P are, in turn, coupled to a security panel 50 via a communication link 52. The link 52 may be provided by electrical conductors or may be provided in the form of a wireless communication path.

The secured areas 12, 14, 16, 18 may be accessed by a group 54 of persons 56, 58 authorized to enter the secured areas 12, 14, 16, 18. Each of the persons 56, 58 may be assigned a respective access card 60, 62 (in the case where card readers are used). Each of the cards 60, 62 may be encoded with an identifier of the person 56, 58 assigned to use the card 60, 62.

Included within the security panel 50 is a corresponding file 64, 66 that contains the identifier of the respective person 56, 58. In addition to the identifier of the person 56, 58, the corresponding file 64, 66 also contains a security rating or level. For example, a first security level may allow a first person 56, 58 to enter the first security area 12, but not the inner security areas 14, 16, 18. Another security level may allow a second person 56, 58 to enter the outer security area 12 and the inner security area 18. A third security level may allow a third person 56, 58 to enter the outer security area 12 as well as all of the inner security areas 14, 16, 18. Other security levels are also possible.

In general, each time a person 56, 58 desires to enter a security area 12, 14, 16, 18, the person 56, 58 may swipe his/her card 60, 62 through the appropriate card reader A-P. In response, the card reader A-P reads the card (e.g., the magnetic stripe, excites and reads a RFID element, etc.) to recover the identifier and send the identifier to the security panel 50.

Within the security panel 50, an access processor 68 compares the received identifier with the identifiers within each of the files 64, 66. If the processor 68 finds a match within one of the files 64, 66, then the processor 68 retrieves a security level from the file 64, 66 and compares the security level with the security level of the area 12, 14, 16, 18 into which the person 56, 58 is requesting access. If the security level of the file 64, 66 meets or exceeds the security level of the area 12, 14, 16, 18, then the processor 68 sends a signal to the access controller 35, 36, 38, 40, 42, 44, 46, 48 granting passage through the access point 20, 22, 24, 26, 28, 30, 32, 34.

Under an illustrated embodiment of the invention, an occupancy processor 84 within the control panel 50 monitors for the presence of persons 56, 58 within the secured areas 12, 14, 16, 18 based upon access grants from the access processor 68 and deactivates user identification devices A-M based upon the presence and distribution of any detected persons 56, 58.

Figure 2:
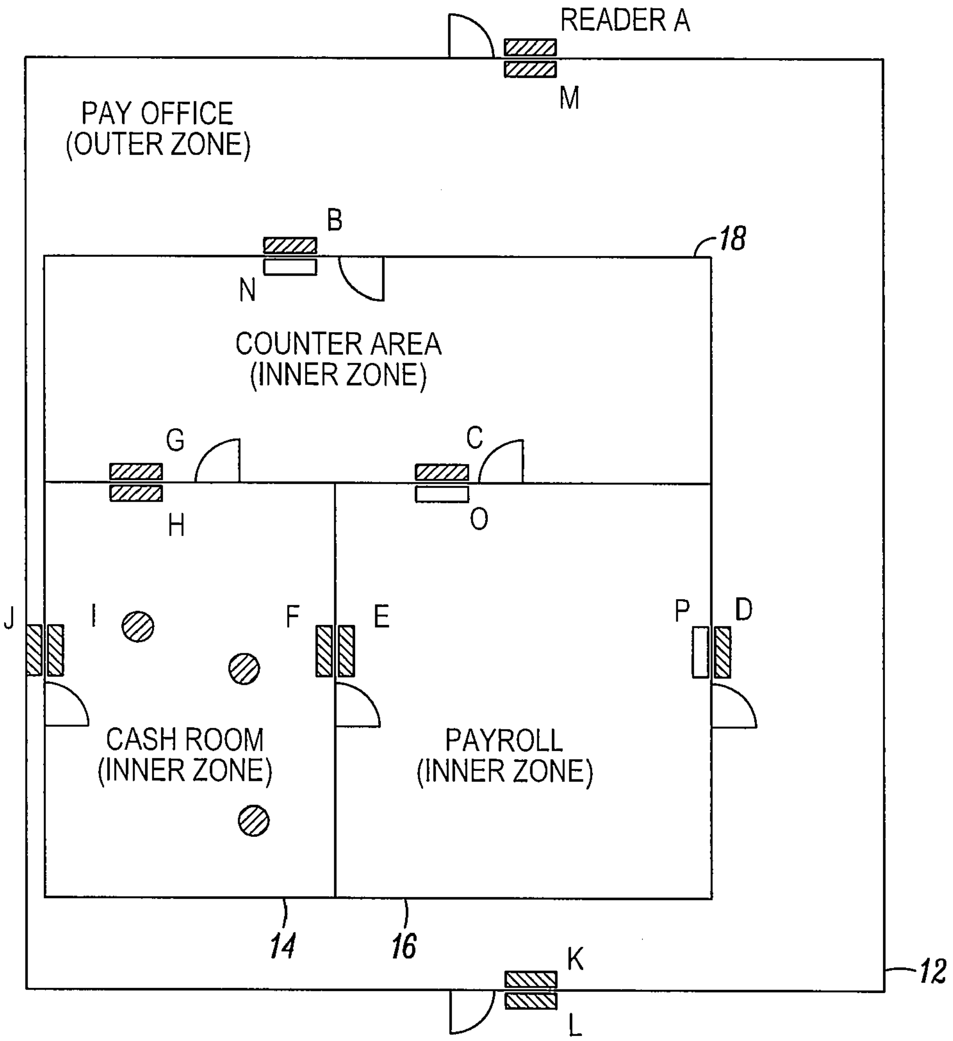
FIG. 2 depicts the security system of FIG. 1 with three occupants in one particular security area.

For example, FIG. 2 shows three persons (represented by the black dots) located within the inner security area 14. Each person 56, 58 may enter the inner security area 14 by first swiping his/her card 60, 62 sequentially through the card readers in A, B, G. In each case, the occupancy processor 84 may track movement (and location) of each of the three persons 56, 58 by detecting a respective access grant by the access processor 68.

In this case, as long as the three persons 56, 58 remain located with the inner security area 14, then a number of the user identification devices A-P could be deactivated without detracting from the functionality of the system 10. In this case, the reader out devices F, H, I would remain activated because they are inside the area containing the persons 56, 58. However, there are no persons 56, 58 in the security areas 12, 14, 16 (i.e., outside of the area 18). For example, since the read in devices E, G, J are on the outside of the security area 18, these devices E, G, J are deactivated by the occupancy processor 84. Similarly, since there are no persons 56, 58 outside of the security area 14 in the security areas 12, 14, 18, the reader devices B, C, D, E, G, J, K, M, N, O and P are also deactivated. The readers A and L remain activated because other persons 56, 58 could enter from the outside.

Figure 3:
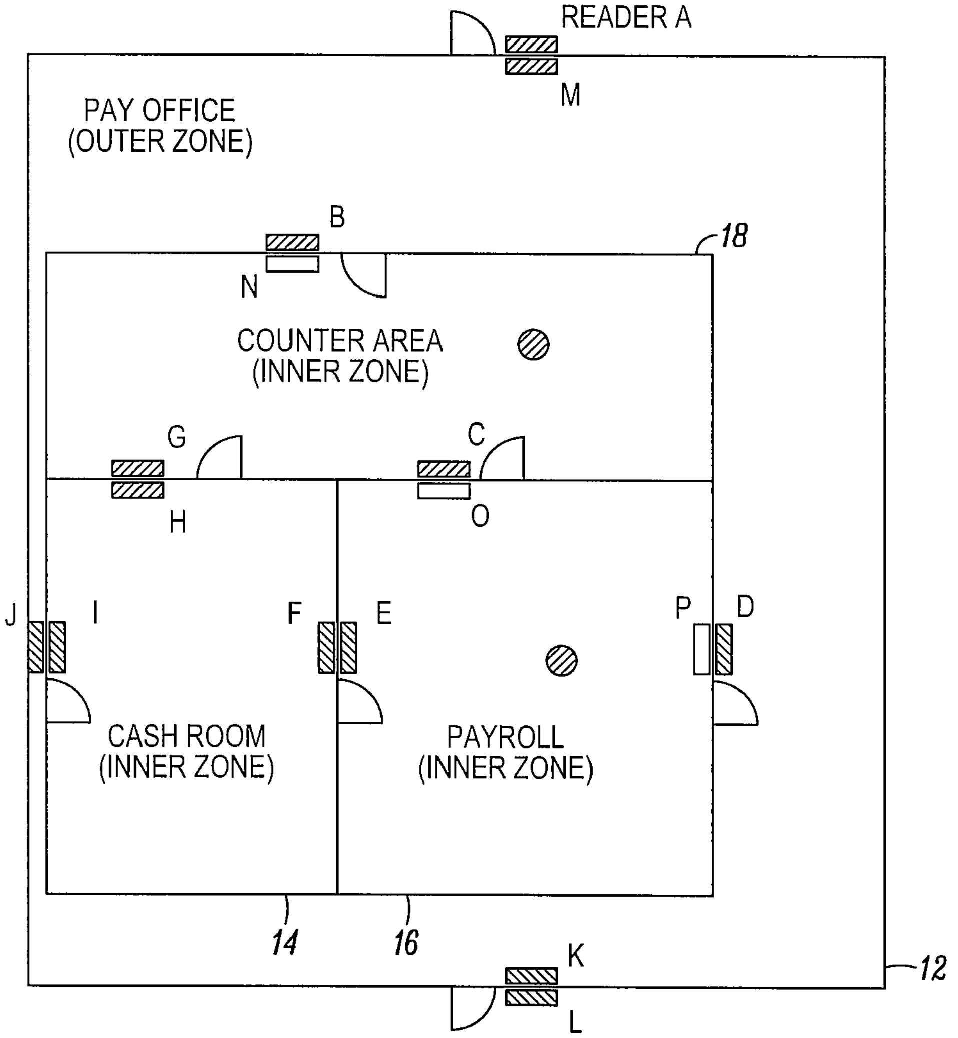
FIG. 3 depicts the security system of FIG. 1 with two occupants located in different security areas.

FIG. 3 depicts another example of the embodiment. In this case, the persons 56, 58 are located in the security areas 16 and 18. In this case, the read out devices C, E, G, N and P remain activated because the persons 56, 58 have direct access to these devices C, E, G, N, P and because the persons 56, 58 may use these devices to enter/exit to other areas. Since there is no person 56, 58 inside of the inner security area 14, the reader devices F, H and I are deactivated. Similarly, since there is no person 56, 58 in the area 12 (outside of the areas 14, 16, 18, hereinafter "outer security area 12"), the reader devices B, D, J, K and M are also deactivated.

Figure 4:
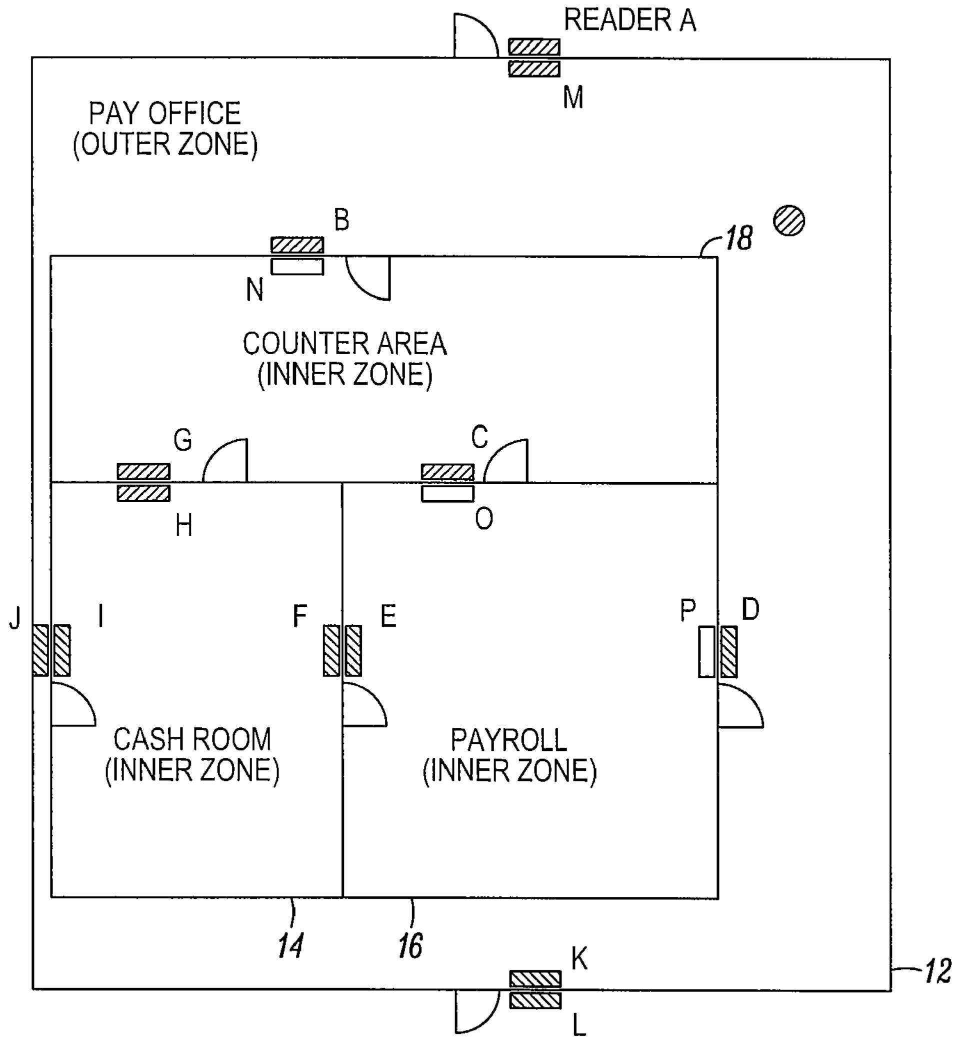
FIG. 4 depicts the security system of FIG. 1 with one occupant located in an outer security area.

FIG. 4 is another example of this embodiment. In this case, a single person 56, 58 remains in the area 12 (outside of the areas 14, 16, 18). In this case, the read out/in devices C, E, F, G, H, I, N, O, P are deactivated. However, since the person 56, 58 has direct access to the reader devices B, D, J, K, M, these devices remain activated.

Figure 5:
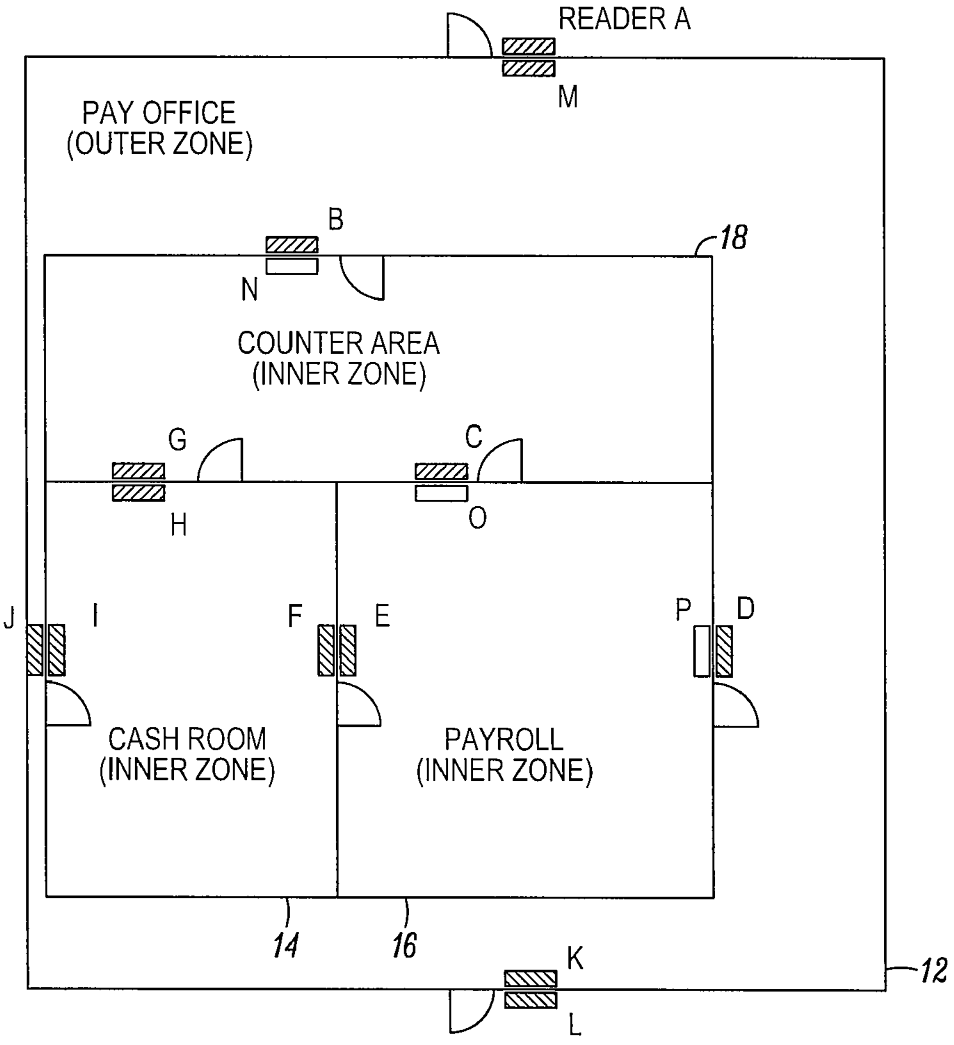
FIG. 5 depicts the security system of FIG. 1 with no occupants.

FIG. 5 depicts an example where the persons 56, 58 have completely vacated the secured area 12, 14, 16, 18. In this case, the interior devices B-I, K and M-P are deactivated. Similarly, the exterior reader devices A, L remain activated to detect requests for entry.

Figure 6:
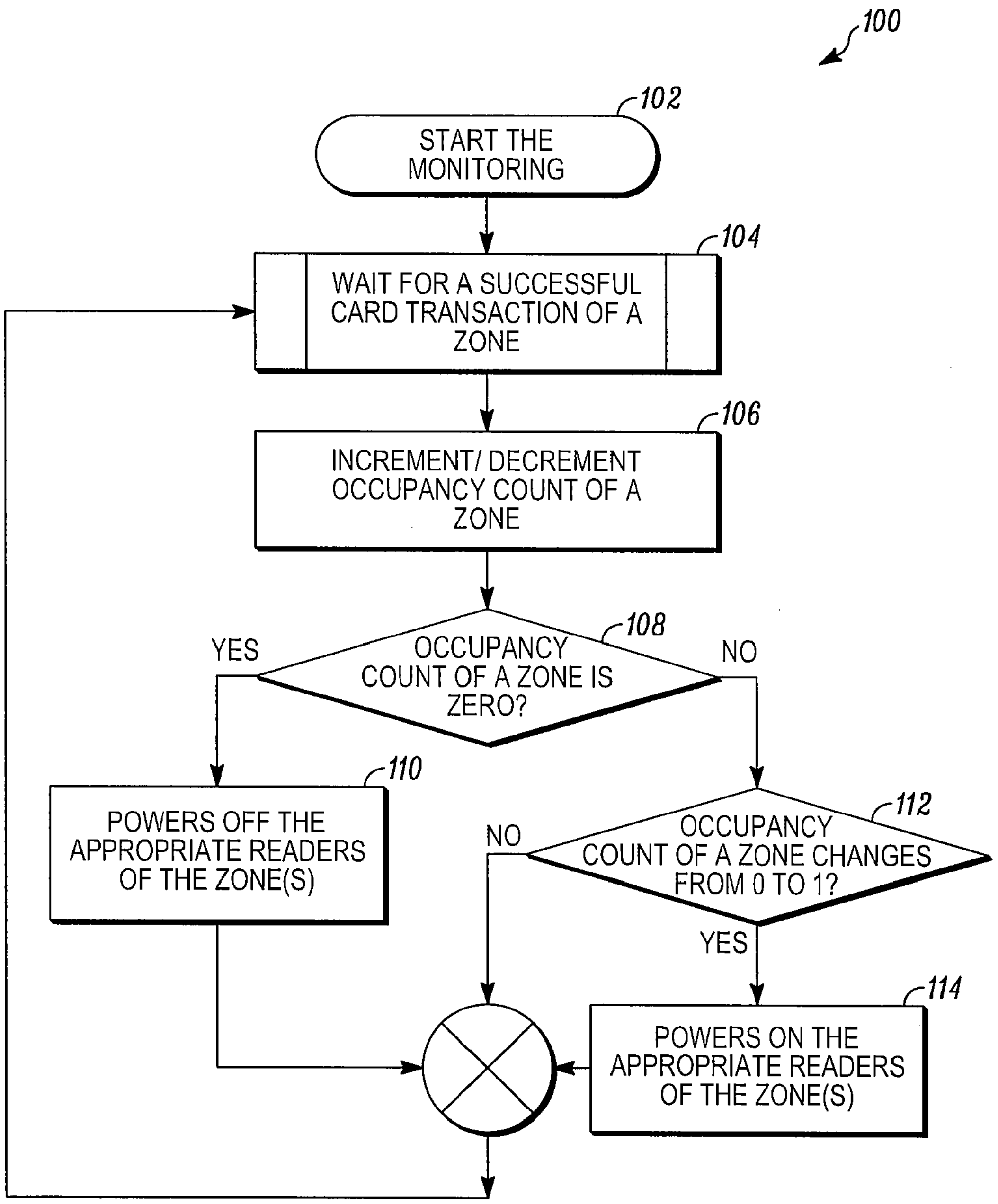
FIG. 6 is a flow chart that depicts method steps that may be followed by the security system of FIG. 1.

In general, FIG. 6 depicts the process 100 used by the occupancy processor 84 of the system 10 for monitoring the areas 12, 14, 16, 18. As shown, once initiated 102, the system 10 waits 104 for activation of a card reader A-P. For example, if the control panel 50 should detect 104 a card read in signal from the reader A, then the control panel 50 unlocks the access point 20, thereby allowing the person to enter the security area 12. The panel 50 also increments 106 a counter that tracks the number of people within each of the security areas 12, 14, 16, 18. In this case, since the panel 50 has granted access into the outer security area 12, the panel 50 increments a counter associated with the outer area 12.

The system 10 then determines 108 if at least one person 56, 58 is located in each of the security areas 12, 14, 16, 18. Since the outer area 12 has changed 112 from an occupancy of zero to an occupancy of at least one person 56, 58, the panel 50 activates 114 each of the readers B, D, J, K, M within the outer area 12.

Similarly, if the person 56, 58 should swipe his card 60, 62 through the reader B, then the panel 50 may check for whether the person 56, 58 has clearance to enter the area 18. If the person 56, 58 has clearance to enter the area 18, then the panel unlocks the access point 22. The panel 50 also decrements the counter associated with the outer area 12 and increments the counter associated with the area 18.

The panel 50 then determines a status for each of the areas 12, 14, 16, 18. Since the occupancy for the outer area 12 has gone from one to zero, the panel deactivates 110 the readers B, D, J, K, M in the outer area 12 and activates the readers C, G, N inside the security area 18.

In another embodiment, the security areas 12, 14, 16, 18 are each provided with at least one motion detector 70, 72, 74, 76, 78. In this case, the motion detectors 70, 72, 74, 76, 78 operate to detect deviations in the proper use of the access cards 60, 62. For example, the proper use of the access cards 60, 62 requires each person 56, 58 entering a secured area 12, 14, 16, 18 to swipe his/her card through a card reader. However, when two persons enter together, it is also common practice for the second person to neglect swiping his/her card and, instead, to piggyback onto the first person's grant of access into the secured area.

Under the illustrated embodiment, the motion detectors 70, 72, 74, 76, 78 are used to override deactivating the card readers whenever motion is detected within a security area 12, 14, 16, 18. This avoids the situation where the security panel 50 deactivates the card readers inside a security area 12, 14, 16, 18 while there is still a person within the area. For example, if two persons 56, 58 were to enter the outer area 12 and only the first of the two persons 56, 58 were to swipe his/her card 60, 62 through the card reader A, then the security panel 50 would only be aware of the first person 56, 58 in the outer security area 12. If the first person 56, 58 were to exit the area by swiping his/her card 60, 62 through the reader M, then the security panel 50 would determine 108 that the occupancy count of the outer area 12 was zero and would, otherwise, attempt to deactivate the readers B, D, J, K, M. However, if the presence of the second person 56, 58 is detected by the motion sensor 70, then the detected motion overrides the deactivation of the readers B, D, J, K, M and, instead, maintains the readers B, D, J, K, M in an activated state.

In still another illustrated embodiment, the security system 10 is provided with an uninterruptible power supply (UPS) 80 that powers the security system 10 during power outages. During power outages, the deactivation of the readers A-P based upon occupancy (as described above) extends the reserve power of the UPS 80, thereby extending the time period in which full functionality of the security system 10 is maintained.

In order to further extend the functionality of the system 10, the access points 20, 22, 24, 26, 28, 30, 32, 34 are classified in order of importance or security level. For example, the secured area 14 may contain confidential information and may receive a classification of 5 (i.e., most secure), and the outer area 12 may receive a classification of 1 (i.e., least secure). When a power outage occurs, a power reserve processor 82 is pre-programmed to sequentially power down the lower levels (e.g., level 1 access points (e.g., locks) 20, 34) after a predetermined amount of time. Alternatively, the power reserve processor 82 may be programmed to monitor a battery reserve capacity (e.g., voltage) and power down the lower level (e.g., the level 1) access points 20, 34 when the reserve capacity reaches some minimum threshold level.

Under still another illustrated embodiment, an administrator may supply a type or a model number for each of the access points 20, 22, 24, 26, 28, 30, 32, 34. In this case, the type or the model number would identify a power requirement of the lock and the associated card readers. The power reserve processor 82 may receive the power requirements along with a reserve capacity of the UPS 80 and calculate a time period of full and reduced operation based upon the reserve capacity and the power requirements.

By providing the power requirements and the classification of each access point 20, 22, 24, 26, 28, 30, 32, 34, the power reserve processor 82 is able to maintain either full or reduced functionality under any of a number of different operating modes. For example, the power reserve processor 82 may sequentially power down the access points 20, 22, 24, 26, 28, 30, 32, 34 based upon time, upon a reserve capacity, or upon a relative power consumption rate of the respective access points. In this case, the power reserve processor 82 may power down the lowest classification first (e.g., level 1 security) and sequentially progress to the next higher classification (e.g., level 2 security) after some predetermined time period. Alternatively, the power reserve processor 82 may power down at least some of the access points 20 or 34 where alternatives exist based upon relative power consumption or where guards could be posted. The ability of the power reserve processor 82 to monitor battery reserve allows the power reserve processor 82 to provide a constant readout of the remaining time left (in minutes) before the UPS 80 is completely depleted of power.

As a still further alternative, an administrator of the security system 10 may assign a priority level to the access points 20, 22, 24, 26, 28, 30 independently of the security level of the area that the access point 20, 22, 24, 26, 28, 30 protects. For example, commonly used doors may be assigned a high security level while less used and rarely used doors may be assigned a lower security level. In this case, the administrator may access an input of the alarm panel and provide the alarm panel with an ordered list of the access points 20, 22, 24, 26, 28, 30 based upon priority. Under this scenario and in the event of a power failure, a lobby door and a main entrance are still powered, and side doors or less commonly used doors are the first to be deactivated. In this case, the less commonly used doors would require some form of high security key to manually open while the more commonly used doors would still be electrically powered from the battery backup.

A specific embodiment of a method and an apparatus for securing a protected space has been described for the purpose of illustrating the manner in which the invention is made and used. It should be understood that the implementation of other variations and modifications of the invention and its various aspects will be apparent to one skilled in the art and that the invention is not limited by the specific embodiments described. Therefore, it is contemplated to cover the present invention and any and all modifications, variations, or equivalents that fall within the true spirit and scope of the basic underlying principles disclosed and claimed herein.

The invention claimed is:

1. A method comprising:

providing a secured space including a first secured area and a second secured area, wherein the second secured area is accessed through the first secured area, and wherein the second secured area has a higher security level than the first secured area;

controlling access into the first secured area via a first access controller;

controlling access into the second secured area via a second access controller;

an occupancy processor monitoring the first and second secured areas for a presence of persons based upon access grants from the first and second access controllers;

deactivating power to the second access controller associated with the second secured area when there are no occupants within the first secured area, wherein the deactivating includes deactivating the power to the second access controller in accordance with a predetermined event and a security level, and wherein the predetermined event is a power failure;

measuring a reserve battery backup power level following the power failure;

deactivating the first access controller associated with the first secured area upon detecting that the reserve battery backup power level is lower than a threshold; and continuing to supply the power to the second access controller upon detecting that the reserve battery backup power level is lower than the threshold.

2. The method of claim 1 further comprising deactivating an egress portion of the first and second access controllers upon detecting egress of a last of the persons from the first and second secured areas.

3. The method of claim 2 further comprising deactivating an entrance portion of the first and second access controllers upon detecting that there is no one within the first secured area.

4. The method of claim 3 further comprising reactivating the egress portion of a respective one of the first and second access controllers upon detecting an intruder within the first or second secured areas.

5. An apparatus comprising:

a secured space;

a first secured area and a second secured area within the secured space, wherein the second secured area is accessed through the first secured area, and wherein the second secured area has a higher security level than the first secured area;

a security panel that 1) controls access into the first secured area via a first access controller and 2) controls access into the second secured area via a second access controller; and an occupancy processor that monitors each of the first and second secured areas for a presence of persons based upon access grants from the first and second access controllers and that deactivates power to the second access controller associated with the second secured area when there are no occupants within the first secured area, wherein the occupancy processor deactivates the power to the second access controller in accordance with a predetermined event and a security level, and wherein the predetermined event comprises a power failure; and a power reserve processor that measures a reserve battery backup power level following the power failure and deactivates the first access controller upon detecting that the reserve battery backup power level is lower than a threshold while continuing to supply the power to the second access controller.

6. The apparatus of claim 5 wherein the first and second access controllers further comprise an egress portion, and wherein the egress portion of a respective one of the first and second access controllers detects egress of a last of the persons from the first or second secured areas.

7. The apparatus of claim 6 wherein the second access controller further comprises an entrance portion, and wherein the entrance portion detects that there is no one within the first secured area.

8. The apparatus of claim 7 further comprising a motion detector that reactivates the egress portion of the respective one of the first or second access controllers upon detecting an intruder within the first or second secured areas.

9. An apparatus comprising:

a secured space;

a first secured area and a second secured area within the secured space, wherein the second secured area is accessed through the first secured area, and wherein the second secured area has a higher security level than the first secured area;

first and second access controllers that control access into respective ones of the first and second secured areas;

an uninterruptable power supply that powers the first and second access controllers during a power failure;

an occupancy processor monitoring each of the first and second secured areas for a presence of persons based upon access grants from the first and second access controllers;

a security panel that deactivates power to the second access controller associated with the second secured area when there are no occupants within the first secured area; and a power reserve processor that deactivates the power to the first access controller controlling access into the first secured area while continuing to supply the power to the second access controller during the power failure upon detecting that a reserve power level is lower than a threshold level.

10. The apparatus as in claim 9 wherein the security panel controls the access into the first and second secured areas via the first and second access controllers, and wherein the occupancy processor deactivates at least one of the first and second access controllers in accordance with a predetermined event and a security level.

11. The apparatus of claim 10 wherein the at least one of the first and second access controllers deactivated by the occupancy processor further comprises an egress portion, and wherein the predetermined event includes detecting egress of a last of the persons from the first and second secured areas.

12. The apparatus of claim 11 wherein the at least one of first and second access controllers deactivated by the occupancy processor further comprises an entrance portion, and wherein the entrance portion detects that there is no one within the first secured area.

13. The apparatus of claim 12 further comprising a motion detector that reactivates the egress portion upon detecting an intruder within the first or second secured areas.

14. The apparatus of claim 9 wherein the power reserve processor deactivates the first and second access controllers based upon a relative power consumption rate of each of the first and second access controllers.

15. The apparatus of claim 9 further comprising an ordered list of access points provided by a system administrator that powers down less used or rarely used ones of the access points before main entrances.

* * * * *